July 18, 1967 L. R. BLOCKER 3,331,449
GROUND DRIVEN DISC CULTIVATOR
Filed Feb. 2, 1965 3 Sheets-Sheet 2
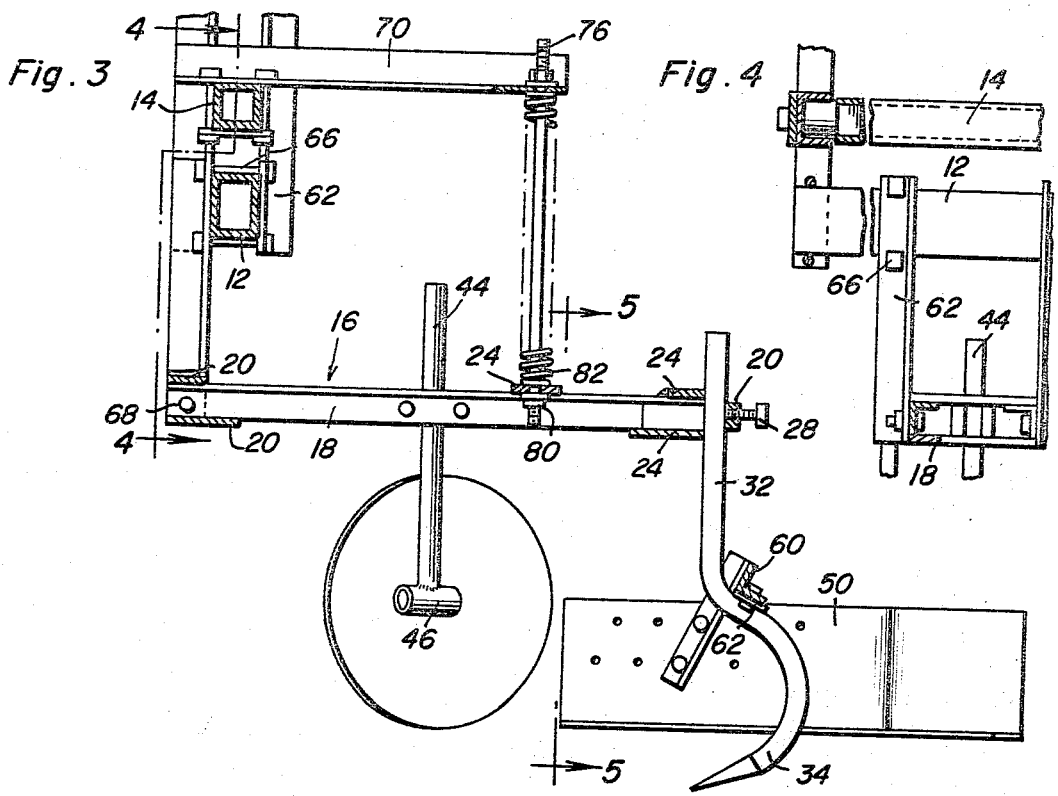
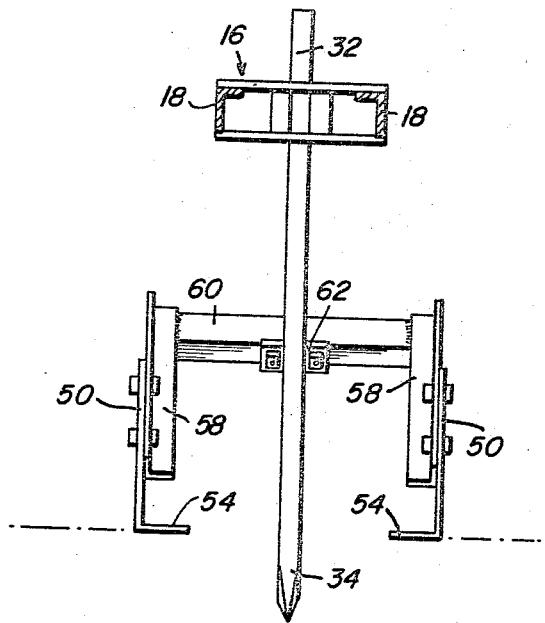
Leo R. Blocker
INVENTOR.

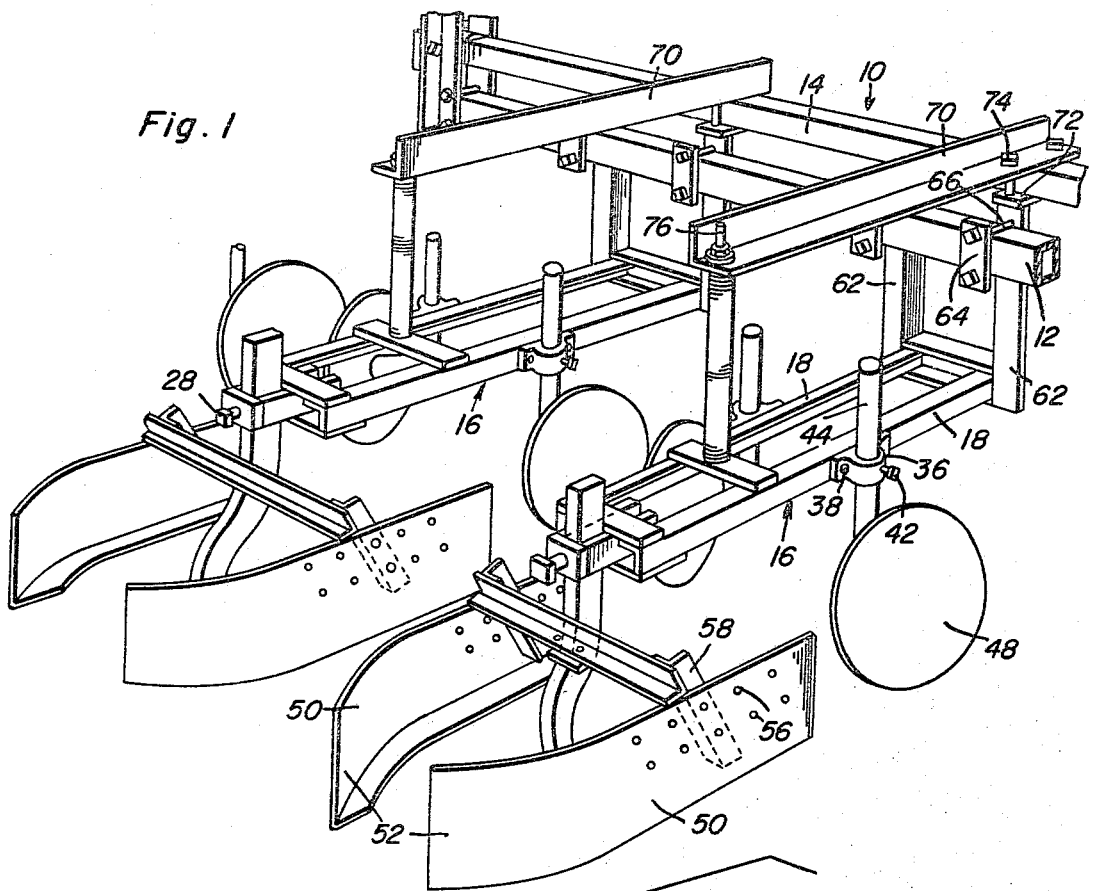
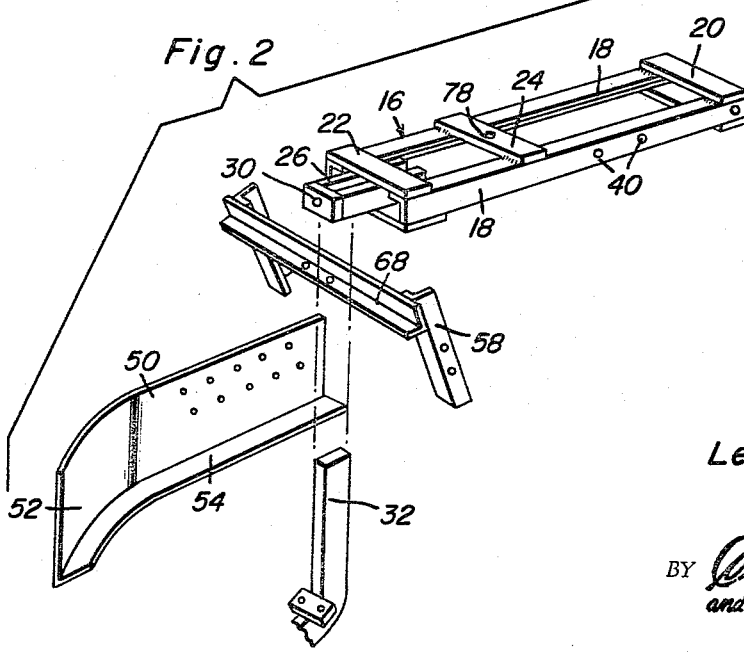

July 18, 1967  L. R. BLOCKER  3,331,449
GROUND DRIVEN DISC CULTIVATOR
Filed Feb. 2, 1965  3 Sheets-Sheet 3

Leo R. Blocker
INVENTOR.

BY *Clarence A. O'Brien*
*and Harvey B. Jacobson*
Attorneys

United States Patent Office 3,331,449
Patented July 18, 1967

3,331,449
GROUND DRIVEN DISC CULTIVATOR
Leo R. Blocker, Nielsville, Minn.
(Donaldson, Minn. 56720)
Filed Feb. 2, 1965, Ser. No. 429,752
7 Claims. (Cl. 172—159)

ABSTRACT OF THE DISCLOSURE

A cultivator assembly including side-by-side support units pivotally mounted at their forward end portions for free individual angular displacement about horizontal transverse axes with adjustable means being provided for limiting downward movement of each support unit and with each support unit provided with a depending cultivator tool adapted to cultivate the ground between adjacent rows of crops as well as a pair of opposite side laterally spaced apart upstanding plate-like surface knives projecting both forwardly of and rearwardly of the associated tool, including rear end portions which are angled inwardly partially behind the associated tool and preceded by means of opposite side dependingly supported cultivator discs spaced forwardly of the forward ends of each pair of knives and aligned with the forward ends thereof, the adjacent knives of adjacent support units being laterally spaced apart a distance adapted to closely receive therebetween a row of young plants.

---

This invention comprises a novel and useful ground driven disc cultivator and more particularly pertains to an agricultural attachment adapted to be connected to and propelled by a tractor for cultivating multiple row crops.

It is the primary purpose of this invention to provide an agricultural device specifically adapted for efficiently cultivating simultaneously a plurality of crop rows and which shall include a plurality of cultivator units, or assemblies, each positioned for cultivating a single row and each of which shall be mounted for individual free swinging vertical movement to accommodate itself to the contour of the ground together with means for adjustably limiting the downward movement of the cultivator unit assemblies individually or as a group and for resiliently limiting their upward swinging movement.

A further object of the invention is to provide an apparatus in the form of the preceding objects which shall employ rotary cultivator discs whose rotation is effected by the passage of the device over the ground being cultivated.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 1–5 relate to a first embodiment of apparatus wherein,

FIGURE 1 is a perspective view of the attachment, parts being broken away and shown in section;

FIGURE 2 is an exploded perspective view of certain related portions of the device;

FIGURE 3 is a view partly in vertical longitudinal section and partly in elevation of the apparatus of FIGURE 1;

FIGURE 4 is a detailed view of a portion of FIGURE 3 taken in vertical transverse section substantially upon the plane indicated by section line 4—4 of FIGURE 3;

FIGURE 5 is a further detail view in vertical transverse section taken substantially upon the plane indicated by section line 5—5 of FIGURE 3;

Figure 6:
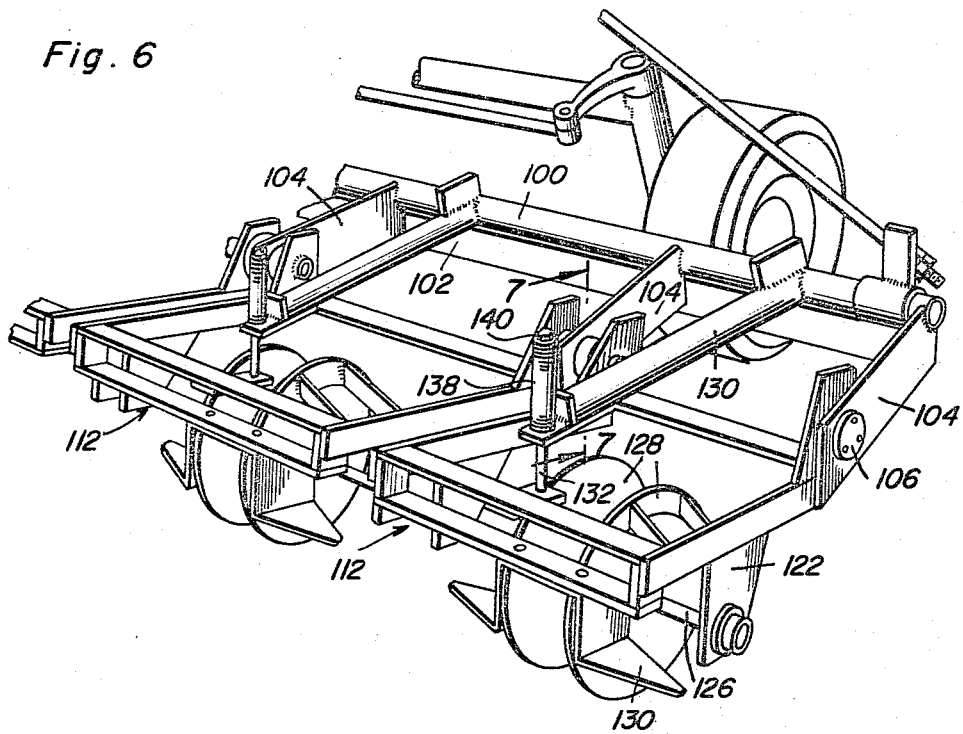
Figure 8:
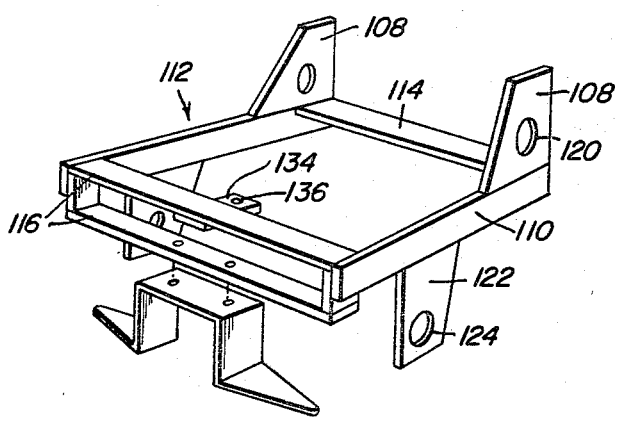
Figure 7:
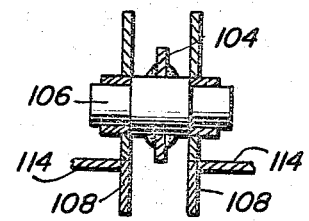

FIGURES 6–8 relate to a second embodiment of the invention wherein,

FIGURE 6 is a perspective view of a second construction in accordance with the invention, parts being broken away;

FIGURE 7 is a detail view in vertical transverse section taken substantially upon the plane indicated by section line 7—7 of FIGURE 6; and FIGURE 8 is an exploded perspective view of one of the support units of the device.

Referring first to the construction disclosed in FIGURES 1–5, it will be noted that the numeral 10 designates generally a cultivator attachment or device which is adapted to be connected to, mounted upon and propelled by any conventional type of farm tractor and preferably at one end thereof. Indicated by the numerals 12 and 14 respectively, are a pair of generally horizontally disposed and transversely extending bars or rods and which comprise a stationary support bar 12 which as illustrated as a hollow bar of rectangular cross-section, while the adjusting bar 14 is oscillatable or tiltable about its horizontal axis. The two bars 12 and 14 may form a part of or are mounted upon the conventional tool supporting or tool handling equipment of a conventional farm tractor. Inasmuch as the actual mounting of these bars and the means for effecting rocking or tilting of the adjusting bar 14 form no part of the invention set forth and claimed hereinafter, but may be of any conventional and known designs, a further description thereof is deemed to be unnecessary.

The attachment 10 includes a plurality of support units 16, there being two such units illustrated in FIGURE 1 although it will be appreciated that any desired number of support units may be utilized, there being one such unit for each row to be cultivated by the apparatus. Since the support units are of identical construction, a description of one will suffice for an understanding of each of the units.

Each support unit 16 is of an open frame construction fabricated in any suitable manner, as for example by the use of conventional structural elements such as angle members, channel members, metal straps and the like. Conveniently, although not necessarily, each support unit is an open generally rectangular frame disposed in a generally horizontal direction and which is pivotally mounted at its forward end by a mounting means from the stationary support bar 12. Each support unit includes a pair of side frame members 18, see also FIGURE 2, which are rigidly connected together at their opposite ends as by cross-members 20 and 22 with a further transversely extending strap 24 extending thereacross intermediate the ends of the side frame members 18. A U-shaped bracket or yoke 20 is rigidly secured to the pair of end members 22 at the rearward or outer end of the support unit 16 and projects rearwardly therefrom, receiving a fastening means in the form of a bolt 28 engaged in a screw-threaded bore 30 and by means of which there is releasably clamped the upper portion of the shank 32 of a cultivator or agricultural tool 34.

Secured to the side frame members 18 at the outer sides thereof are a pair of mounting brackets 36 secured as by fasteners 38 extending into threaded bores 40 in the support unit side frame members, and each of which is provided with a fastening bolt 42 for releasably securing the upper portion of the shaft 44 whose lower end has a hub portion 46 in which is rotatably journalled and retained the axle or trunnion of the cultivator disk 48.

As thus far desecribed it will be apparent that the disk 48 and the tool 32 may be adjusted vertically upon the support units 16 in accordance with the particular agricultural operation to be performed by the apparatus.

Also mounted upon the support unit 16 are a pair of shoes 50. Each of the shoes 50 is a plate-like body disposed generally vertically and longitudinally with an inwardly curving or convergent rearward portion 52 and having an inturned bottom flange 54 which serves as a foot member or foot element tending to stabilize or limit downward penetration of the shoe into the soil. The side plate member is provided with a series of apertures as at 56 by means of which they are adjustably positioned upon and secured to a pair of supporting arms 58, mounted upon the outer ends of a transverse bar 60 which in turn rests upon a mounting pad or bracket 62 bolted or otherwise secured to the shank portion of the tool 32. Thus, the shoes are supported fixedly but adjustably with respect to the cultivator tool 34 on opposite sides thereof and function to rake, move or direct the soil upon the row or furrow opened by the tool 34.

The entire support unit 16 is mounted at its forward end for free floating vertical titlting or pivoting movement about a transverse, horizontal axis. For this purpose, a mounting means is provided by which each unit is movably secured to a support structure which includes the stationary support bar 12.

In the arrangement illustrated, mounting brackets in the form of pairs of vertically depending brackets or legs 62 are removably clamped as by clamping plates 64 and bolts 66 to the support bar 12 and positioned adjustably longitudinally therealong. The side frame elements 18 of each support unit is received between a pair of the brackets 62 and is pivotally mounted thereon as by axles or pivot pins 68 for free vertical swinging movement about a horizontal axis will be apparent from FIGURE 3.

A combined supporting and adjusting means is provided for controlling the limits of vertical tilting or swinging movement of the support units both individually and simultaneously.

A plurality of adjusting levers or arms, one for each support unit, and each indicated by the numeral 70 has one end of each detachably but fixedly clamped to the adjusting bar 14 as by means of clamping brackets or plates 72 and bolts 74. The other end of each lever carries a vertical lift rod 76 whose lower end is threaded and extends through an opening or bore 78 in the previously mentioned bracket or plate 24 intermediate the ends of the support unit 16 and is provided with an adjusting nut 80 therebeneath. A spring 82 encircles the rod 76 and is disposed between the plate 24 and the arm or lever 70. In operation it will be seen that the lower end of the lift rod 76 is slidably and guidingly received in the opening 78 of the support unit 16. The spring yieldingly urges the support unit into its lowermost position and yieldingly resists upward movement of the support unit. Consequently, the adjustable nut 80 on the lowermost end of the lift rod 76 constitutes a positive stop or abutment which limits downward movement of the support unit about its pivot or axis of mounting and tilting while the spring yieldingly resists but allows upward movement of the support unit. Consequently, the support unit is free floating in that it may follow the contour of the ground. Individual movement of the support units is therefore permissible for the entire apparatus. However, the adjusting nut provides a means which adjustably limits the downward travel of each of the support units and enables the entire group of support units to be simultaneously elevated or lifted by tilting of the adjusting bar 14 through its connection to the power operated lift means of the tractor, not shown.

This form of the apparatus, therefore, enables the tool assemblies carried thereby to be individually adjusted for conditions necessary to treat a particular row of a crop while enabling the support units of the entire assembly of tools to be free floating to conform to the contour of the ground and yet to be individually adjusted as to vertical ranges and limits of travel while retaining simultaneous vertical adjustment and control of the device through the power operating lift means of the tractor as connected to the adjusting bar 14.

It will be observed that as illustrated each of the support units is tiltable or pivotable upon a common horizontal and transversely extending axis. However, it is evident that if desired each of the support units could be mounted for tilting about horizontally and transversely extending but different axes of movement.

Reference is now made to the second embodiment of the invention as illustrated in FIGURES 6-8.

As in the preceding arrangement, the cultivator attachment is likewise adapted to be mounted upon, connected to and propelled by a conventional type of tractor at either end thereof and is associated with the horizontally and transversely extending and generally parallel adjusting bar 100 and stationary support bar 102. Fixedly secured to and extending rearwardly and downwardly from the support bar 102 are suitable support brackets 104 to which are pivotally secured as by the pivot pins 106, the mounting brackets 108 of the side frame members 110 of each of the support units 112. The latter or open frame members of a transversely extending end member 114 at one end thereof and a pair of end frame members 116 at its other end. The mounting brackets 108 are apertured as at 120 to receive the previously mentioned pivot pins 106 although it will be appreciated that in some instances it may be preferred, where the pivot axes of the support units are aligned, to provide a common axle or pivot pin for one or more of the support units. In any event, the support units are thus mounted for free vertical tilting movement about a horizontal traverse axis in the same manner and for the same purposes as the support units of the preceding embodiment.

Fixedly secured to and depending from the side frame members 110 intermediate their ends are supporting brackets in the form of plates 122, apertured at 124 for the reception of axles 126 upon which are mounted either fixedly or rotatably cultivator discs 128. Preferably these discs include laterally projecting blades 130 which engage the soil during travel of the device and thus assist in effecting rotation of the discs. It is to be appreciated that the discs may themselves be adjustable longitudinally of their axle 126, while the support units 112 may also be adjustable longitudinally with respect to the support bar 102 by their pivotal connections 106.

As in the preceding form, a support means is provided to control the free floating vertical tilting action of the support units both singly and collectively. For this purpose, there are provided support levers or arms 130 each of which is fixedly secured to the adjusting bar 100 for tilting movement therewith. The arms 130, in the same manner as the arms 70 in the preceding embodiment are disposed in parallel relation to but spaced vertically from the generally horizontal support units 112 and are provided with a slidable and yieldable connection therewith. Thus, a lift rod 132 slidably extends through an opening or aperture in the associated arm 130 and its lower end is secured to a mounting bracket, plate or lug 134 secured to one of the plates 116 of a support unit and apertured at 136 to receive the lift rod 132. The latter, where it extends through and above the arm or lever 130 is encircled by a spring 138 and through an adjusting nut 140 threaded upon the upper end of the lift rod 132 is adjustable. In operation it will be apparent that the spring means provides a resilient abutment or stop yieldingly limiting downward travel or tilting of the associated support unit, while upward tilting movement is limited by the positive stop afforded through direct engagement of the plate or lug 134 with the underside of the lever 130.

Although the resilient connection is reversed with respect to the preceding embodiment, the manner of operation is identical.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cultivator attachment adapted to be connected to and propelled by a tractor, said attachment comprising a plurality of side-by-side generally horizontal support units, means mounting said support units at their forward portions for free, individual vertical tilting about generally horizontal axes extending transversely of the path of movement of the associated tractor, support means connected to each support unit and limiting individual downward tilting while allowing individual upward tilting of each unit, a cultivator tool mounted upon and extending downwardly from the rear portion of each unit, a pair of shoes rigidly supported from the rear end portion of each support unit, disposed on opposite sides of the corresponding tool and positioned to rake and direct soil upon the furrow opened by said tool, said shoes each comprising an upstanding plate-like knife surface means extending generally normal to said axes and including a generally horizontally straight forward end portion projecting forwardly of the corresponding tool and a rear end portion which extends rearwardly of and is inclined slightly inwardly behind the corresponding tool, each of said support units including opposite side dependingly supported cultivator disc means spaced forwardly of and aligned with said forward end portions of said surface knife means, the adjacent knife means of adjacent support units being laterally spaced apart a distance adapted to closely receive therebetween a row of young plants.

2. An agricultural device comprising in combination with a tractor having at one end thereof a pair of generally horizontal transversely extending bars including a stationary support bar and an adjusting bar tiltable about its horizontal axis, a plurality of side-by-side generally horizontal support units, means mounting said support units at their forward ends upon said support bar for individual free vertical tilting movement, support means connected to each support unit and to said adjusting bar for affording free upward tilting but limiting downward tilting of the individual support units, a depending cultivator tool carried by and extending below the rear portion of each support unit, a pair of shoes fixed rigidly supported from the rear end portion of each support unit on opposite sides of the corresponding tool and positioned to move and direct soil upon the furrow opened by said cultivator tool, said shoes each comprising an upstanding plate-like knife surface means extending generally normal to said axes and including a generally horizontally straight forward end portion projecting forwardly of the corresponding tool and a rear end portion which extends rearwardly of and is inclined slightly inwardly behind the corresponding tool, each of said support units including opposite side dependingly supported cultivator disc means spaced forwardly of and aligned with said forward end portions of said surface knife means, the adjacent knife means of adjacent support units being laterally spaced apart a distance adapted to closely receive therebetween a row of young plants.

3. The combination of claim 1 wherein said mounting means includes a support structure having a plurality of mounting brackets, a pivot connecting each support unit to a mounting bracket.

4. The combination of claim 1 wherein said support means includes an adjusting lever for each support unit disposed in vertically spaced generally parallel relation to the latter and connected to said adjusting rod, a lift rod secured to said lever and having a vertically slidable engagement with the associated support unit.

5. The combination of claim 4 wherein each support unit has a vertical opening therethrough, the associated lift rod having a sliding and guided engagement in said opening, means on said lift rod limiting relative sliding of said lift rod through said opening.

6. The combination of claim 5 wherein said limiting means includes a rigid but adjustable abutment for downward movement of said support unit on said lift rod and a resiliently yieldable abutment for upward tilting of said support unit on said lift rod.

7. The combination of claim 1 wherein the lower edge portions of said plate-like surface knife means include inwardly directed generally horizontal bottom flange means.

References Cited

UNITED STATES PATENTS 2,424,014 7/1947 Bobeldyk _____ 172—159
2,674,212 4/1954 Callaham et al. ____ 172—176 X

FOREIGN PATENTS 7,557,717 11/1933 France.
834,611 3/1952 Germany.

ABRAHAM G. STONE, *Primary Examiner.*

ANTONIO F. GUIDA, *Examiner.*

J. R. OAKS, *Assistant Examiner.*